Figure 1:
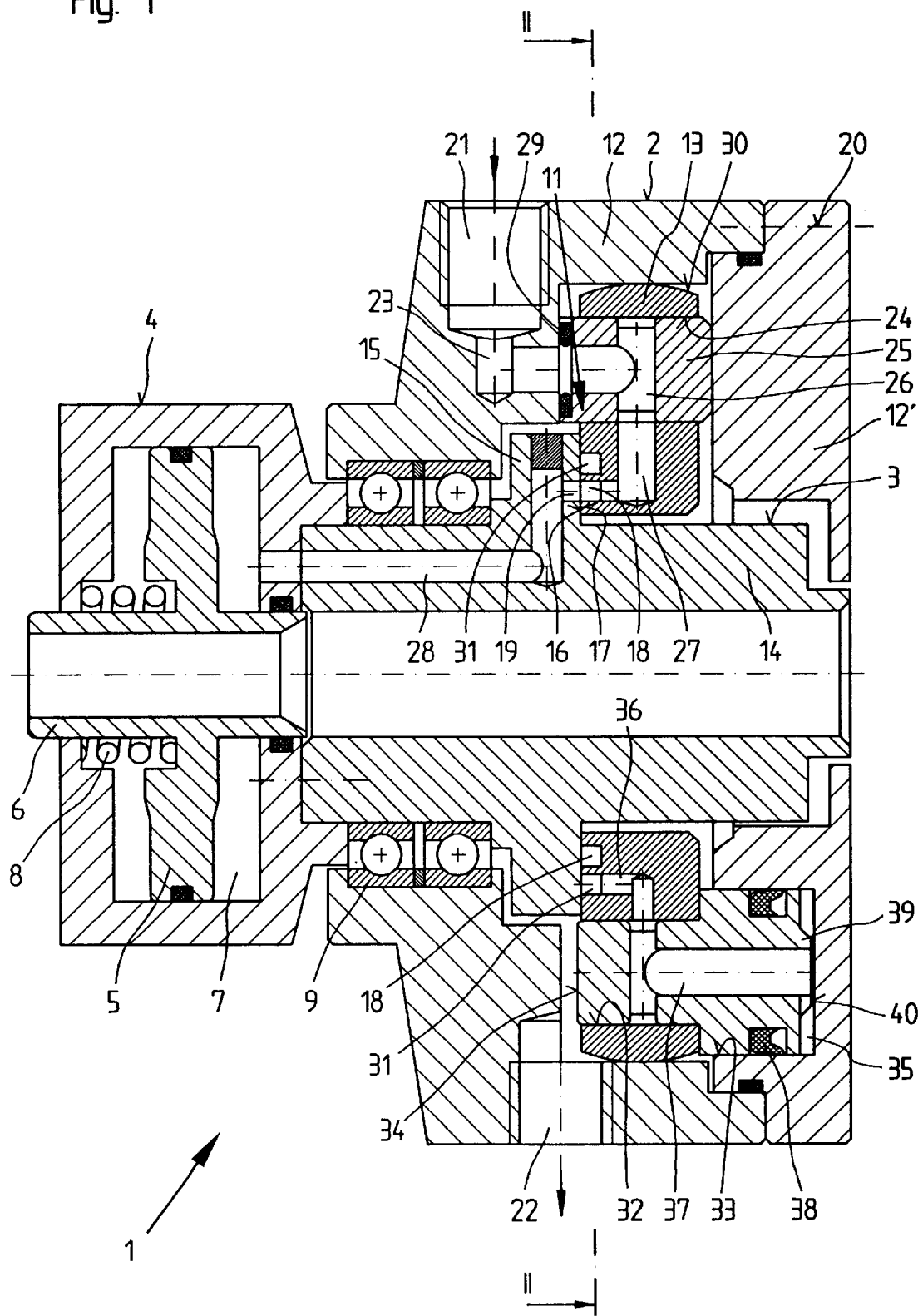

United States Patent
Hiestand

[19]

[11] Patent Number: 6,089,266

[45] Date of Patent: Jul. 18, 2000

[54] DEVICE FOR SUPPLYING A PRESSURIZED MEDIUM

[75] Inventor: Karl Hiestand, Mühlweg 2, V-88630 Pfullendorf, Germany

[73] Assignee: Karl Hiestand, Pfullendorf, Germany

[21] Appl. No.: 09/333,319

[22] Filed: Jun. 15, 1999

[30] Foreign Application Priority Data

Jul. 20, 1998 [DE] Germany .......................... 198 32 508

[51] Int. Cl.[7] ................................................. F16L 27/00
[52] U.S. Cl. ................................... 137/580; 251/175
[58] Field of Search .................... 137/580, 387; 901/22, 29; 251/175

[56] References Cited

U.S. PATENT DOCUMENTS

| | | | |
|---|---|---|---|
| 3,908,695 | 9/1975 | Dunbar | 137/580 |
| 4,726,397 | 2/1988 | Stich | 137/580 |
| 5,269,345 | 12/1993 | Hiestand et al. | 137/580 |
| 5,707,186 | 1/1998 | Gobell et al. | 409/136 |
| 5,799,692 | 9/1998 | Gobell et al. | 137/580 |

*Primary Examiner*—A. Michael Chambers
*Attorney, Agent, or Firm*—Pandiscio & Pandiscio

[57] ABSTRACT

In a device (1) for supplying a pressurized medium from a fixed component (2) into a rotating component (3) with a radially aligned sealing gap (11) provided between the components and in which the fixed component (2) comprises two rings (12, 13), the ring (13) delimiting the sealing gap (11) being held in an axially movable arrangement and with at least one control pressure chamber (35) provided between the two rings (12, 13), the movable ring (13) has an intermediate pressure chamber (31) on its end surface (16) facing the sealing gap (11) with this intermediate pressure chamber (31) being permanently connected to the control pressure chamber (35) by means of ducts (36, 37) worked into the axially movable ring (13).

This embodiment allows the width of the radial sealing gap (11) to be set automatically, thereby practically precluding metal-on-metal friction between the components (2, 3) in the area of the radial sealing gap whilst only small leakage oil losses have to be accepted.

14 Claims, 6 Drawing Sheets

DEVICE FOR SUPPLYING A PRESSURIZED MEDIUM

The present invention relates to a device for supplying a pressurised medium from a fixed component into a rotating, drivable component, in particular for supplying a pressurised medium into a hollow clamping cylinder or the like, with a radially aligned sealing gap being provided between the two components, with annular grooves worked into the facing end surfaces of the components thereby enabling both components to communicate with one another and with the annular grooves being connected to a supply duct for pressurised medium worked into the fixed component and to a duct for conveying the pressurised medium provided in the rotating component, in which aforementioned device the fixed component consists of two rings connected together in a torsionally rigid fashion, with the ring which delimits the sealing gap being held in an axially movable arrangement and at least one control pressure chamber being provided between the two rings.

A hydraulic cylinder arrangement is familiar from DE 24 08 801 A1, in which the pressurised medium is supplied from a two-part fixed component via the radially aligned sealing gap into the rotating cylinder by means of a device of the aforementioned type. In order to achieve permanent contact of the axially movable ring in this arrangement, several preloaded compression springs are inserted between this ring and the other ring of the fixed component and, furthermore, a separate flow of pressurised medium can be supplied to the control pressure chamber provided between the rings by means of an additional pressurised medium connection.

Although the pressure control chamber can also be used for counteracting the high levels of axially vectored force which can build up in the radial sealing gap due to the hydrodynamic friction of the medium to be transported because pressurised medium can be supplied to the control pressure chamber depending on the operating pressure of the medium to be transported, it is not possible to effect an self-adjusting facility for the width of the radial sealing gap in this device of prior art. The pressure continuously exerted by the preloaded compression springs on the axially movable ring causes the rings to be pressed against the rotating cylinder with a constant force, so that it is unavoidable for the axially movable ring to be brought into contact with the cylinder, particularly if a pressurised medium is being transported at a low operating pressure. However, the principal disadvantage is that the movable ring is brought into contact with the rotating cylinder by the force of the compression springs as soon as there is no transport of pressurised medium taking place. The metal-on-metal friction arising under these operating conditions means that there is an usually high degree of wear in the area of the annular grooves so that this device for transporting a pressurised medium cannot achieve a long service life.

The purpose of the present invention is therefore to produce a device for supplying a pressurised medium from a fixed component into a rotating, drivable component of the aforementioned type which not only has a very simple configuration and can therefore be manufactured economically, but also one in which the width of the radial sealing gap is set automatically and above all in a reliable fashion, this procedure being independent of the operating pressure of the pressurised medium to be transported and the relative speeds between the components. The axially movable ring should be in a floating mounting to a certain extent and the radial sealing gap should set itself to the minimum value in each case, thereby practically precluding the possibility of metal-on-metal friction between the two components in the area of the radial sealing gap whilst, on the other hand, only minor leakage losses have to be accepted.

In accordance with the present invention, this is achieved in a device for supplying a pressurised medium from a fixed component into a rotating, drivable component of the aforementioned type in that the ring of the fixed component which is held in a movable arrangement has an intermediate pressure chamber on its end surface facing the sealing gap and this intermediate pressure chamber is arranged with a radial clearance from the annular groove in the component, or that an intermediate pressure chamber is formed between the axially movable ring of the fixed component and the rotating component, with this intermediate pressure chamber comprising an annular gap preferably tilted in an axial direction and being enclosed by the components, and that the intermediate pressure chamber is permanently connected to the control pressure chamber by means of ducts worked into the axially movable ring.

In this embodiment, it is advantageous for the rotating component to be formed by a shaft, preferably a quill shaft, inserted into the fixed component with a shoulder projecting radially from the shaft, and to hold the movable ring of the fixed component on one or more inserts, each of which are arranged in an axially aligned hole, attached to a cover of the fixed component or, given a two-part embodiment of the fixed component, inserted into the fixed component, with one of the inserts being provided with a transfer duct communicating with the supply ducts for pressurised medium which are worked into both rings of the fixed component, and in which the fixed ring accommodating the axially movable ring should support the axially movable ring in a self-aligning fashion by means of an outer jacket surface with, for example, a spherical configuration.

Furthermore, it is advantageous for the control pressure chamber to be formed by one or more pistons supported on the movable ring or the fixed ring with the pistons being inserted in holes worked into both rings. If the control pressure chambers are arranged in the fixed ring, the pistons should be provided with ducts connecting the intermediate pressure chamber with the control pressure chambers.

The surfaces of the control pressure chamber upon which the pressurised medium acts should be larger than the radial surfaces of the intermediate pressure chambers and, if appropriate, the surfaces of the annular groove worked into the axially movable ring taken together. Also, at least one of the control pressure chambers should be provided with an outflow throttle which can be configured in such a way that one of the pistons is inserted into the hole in the fixed ring with radial play and, if the control pressure chambers are arranged in the axially movable ring, each of the control pressure chambers is provided with a connecting duct, or that one of the pistons has a throttle duct connected to the control pressure chamber.

In order to set the radial sealing gap to the maximum size, it is advantageous for the travel distance of the movable ring to be limited by one or more mechanical stops. This can be achieved by having mechanical stops formed by the pistons which are inserted in the axially movable ring and act in conjunction with the fixed ring, with the pistons being provided with a projection on their end surface facing the control pressure chamber.

Furthermore, it is advantageous to assign an equalisation chamber to the annular groove worked in the movable ring, with this equalisation chamber being enclosed by the two rings on the side opposite the annular groove in the movable ring and connected to this annular groove or to the supply duct for the pressurised medium and with the surface of the equalisation chamber which is pressed towards the annular groove being preferably about the same size as the radial annular surface of the annular groove.

If a device for supplying a pressurised medium from a fixed component into a rotating, drivable component is configured in accordance with the present invention, the radially aligned sealing gap will automatically be set to the maximum axial width because an equalisation of pressures takes place continuously by means of the intermediate pressure chamber and the control chamber. This reliably prevents the axially movable ring of the fixed component from coming into contact with the rotating component and thus avoids friction between metal parts. Consequently, trouble-free operation of the device for transporting a pressurised medium is guaranteed over a long period, with the additional advantageous aspect that there is only a small leakage volume. As a result, only a minimum of constructional complexity is required to transport a pressurised medium reliably irrespective of the operating pressure of the medium being transported or the speed differential between the fixed and the rotating components.

Figure 2:
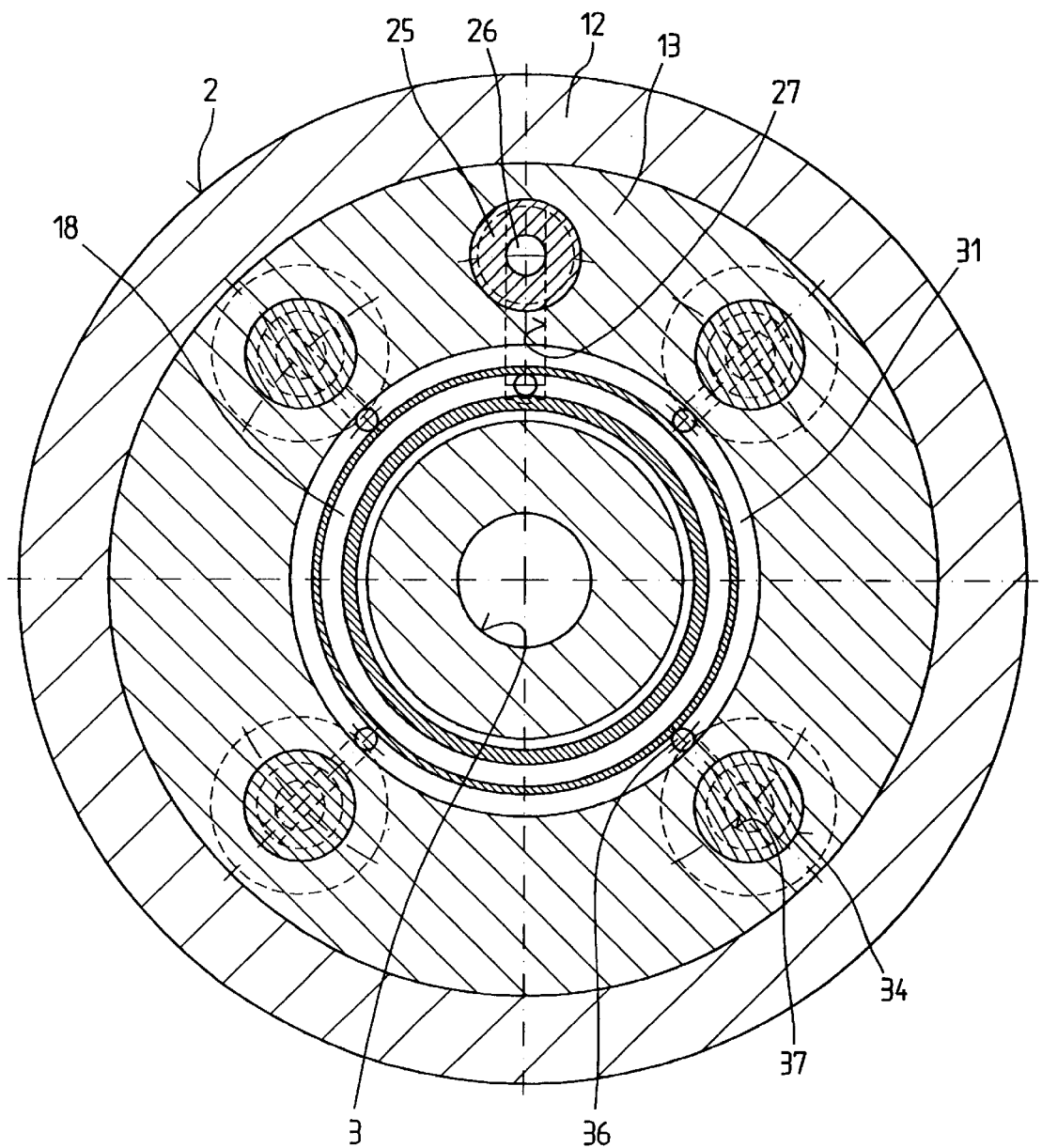
Figure 3:
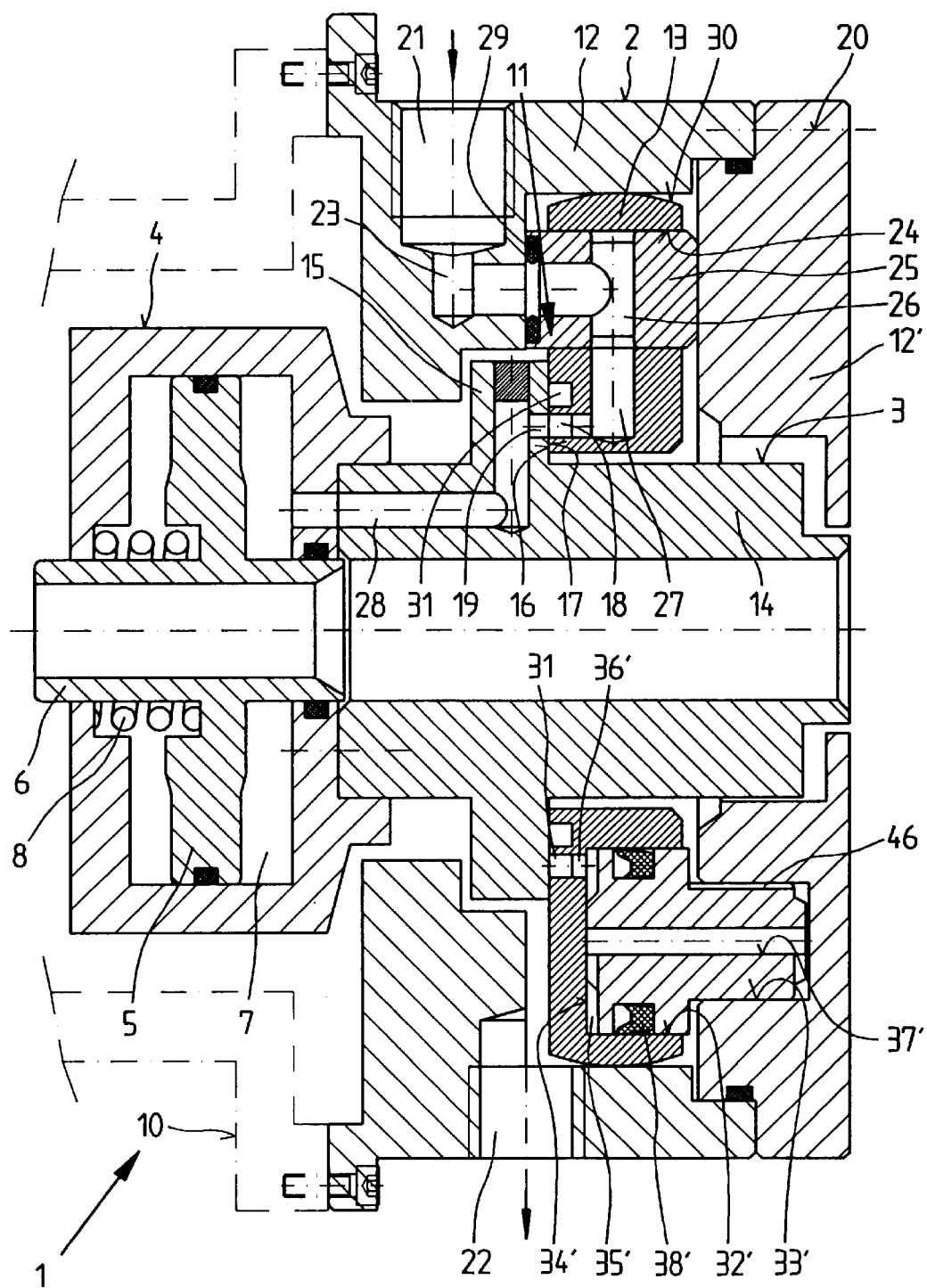
Figure 4:
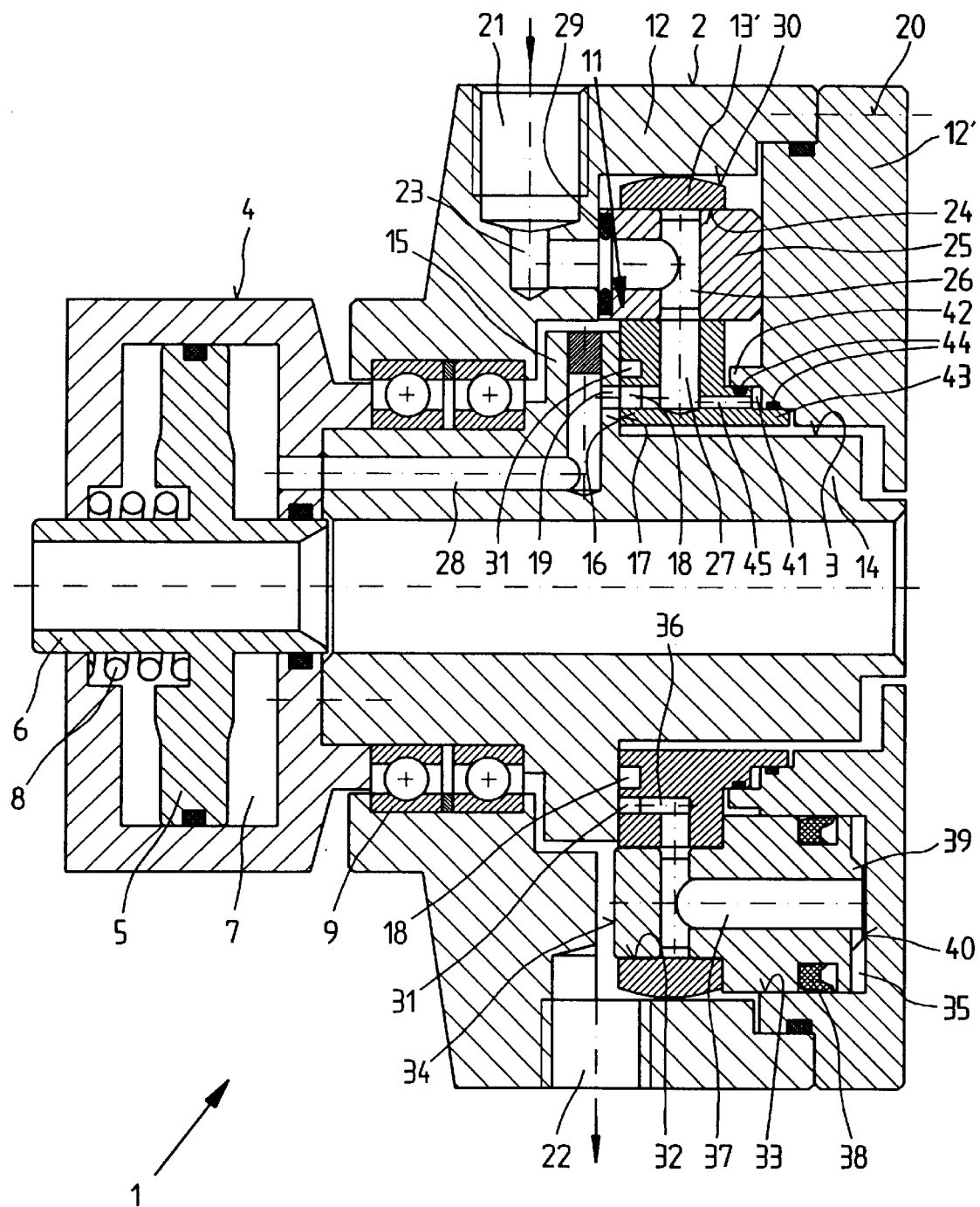
Figure 5:
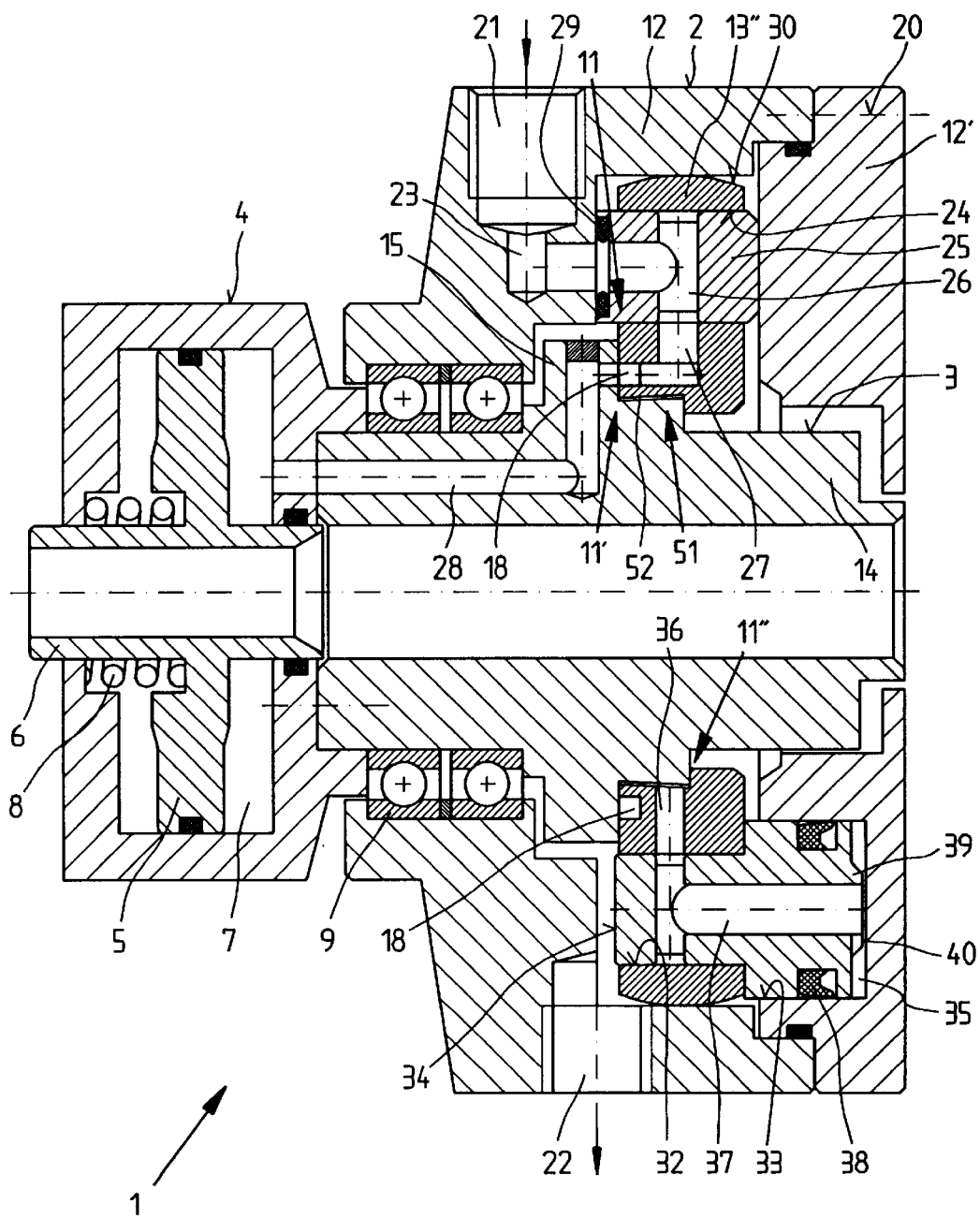
Figure 6:
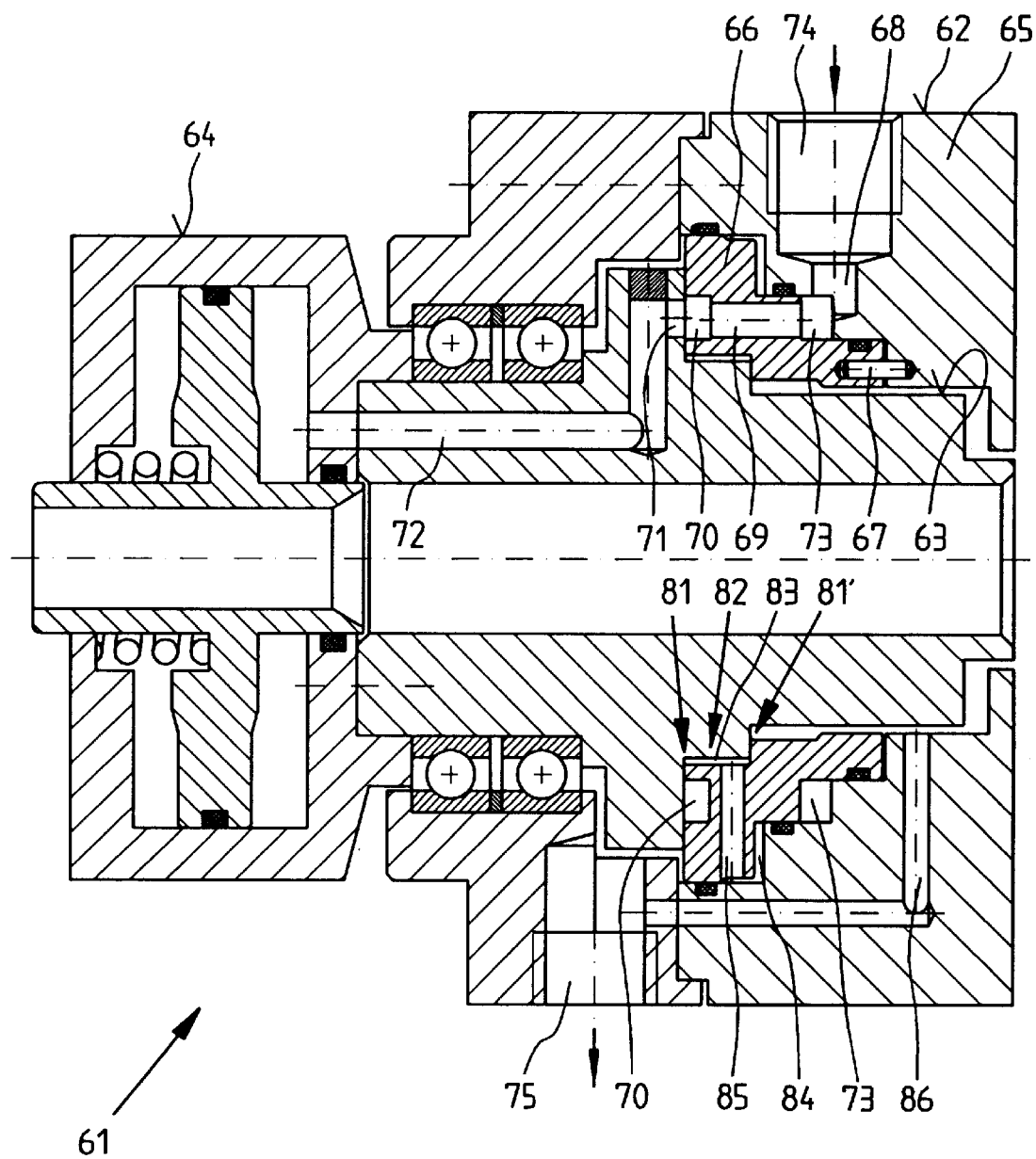

The drawing shows two sample embodiments of the device configured in accordance with the present invention for supplying a pressurised medium from a fixed component into a rotating, drivable component, the details of which are explained below. In the drawing, FIG. 1 shows an axial section through the device for transporting a pressurised medium, FIG. 2 shows a section along line 11—11 of the device for transporting a pressurised medium in FIG. 1, FIG. 3 shows an embodiment of the device for transporting a pressurised medium in FIG. 1, with control pressure chambers provided in the axially movable ring, FIG. 4 shows the device for transporting a pressurised medium in FIG. 1, with an equalisation chamber assigned to the annular groove provided in the axially movable ring, FIG. 5 shows the device for transporting a pressurised medium in FIG. 1, with an intermediate pressure chamber formed by an axially aligned annular gap, and FIG. 6 shows a different embodiment of the device for transporting a pressurised medium in FIG. 5, with axially aligned intermediate pressure and equalisation chambers.

The device shown in FIGS. 1 to 5 and identified by 1 is used for supplying a pressurised medium, for example a hydraulic fluid, from a fixed component 2 into a rotating, drivable component 3 with a hollow clamping cylinder 4 firmly connected to it, and largely consists of two rings 12 and 13 which form the fixed component 2 as well as a quill shaft 14 with a radially projecting shoulder 15 as the rotating component 3, in which a radially aligned sealing gap 11 is provided between the ring 13 and the shoulder 15 by means of which the pressurised medium to be supplied to the hollow clamping cylinder 4 flows out of the ring 13 into the shoulder 15 when pressurised medium is being transported. For this purpose, circumferential and intercommunicating annular grooves 18 or 19 are worked into the end surfaces 16 and 17 of the ring 13 or the shoulder 15 which are facing one another, with the annular grooves 18 or 19 being connected via a connection line 21 or via a duct 28 to a pressure space 7 provided in the cylinder 4 by means of a piston 5 inserted into the cylinder 4. The piston 5 can be pushed axially to the left against the force of a return spring 8 due to the effect of the supplied pressurised medium and the piston is connected to, for example, an actuator of a power-operated chuck by means of a piston rod 6 configured as a quill shaft.

Pressurised medium is supplied into the annular groove 18 of the ring 13 by means of an insert 25 which is inserted in a hole 24 worked into the ring 13 and in the ring 12 which has a cover 12' for this purpose which is fixed on by bolts 20 and held with a small amount of axial play. A duct 26 is worked into the insert 25 and it communicates with ducts 23 or 27 provided in the rings 12 and 13.

In this case, the duct 23 is connected with the connection line 21 and the duct 27 is connected with the annular groove 18 with the result that pressurised medium can be supplied to the annular groove 18 without any losses, particularly since a seal 29 is provided between the insert 25 and the ring 12 which seals the ducts 23 and 26.

As can be seen in particular by reference to FIG. 2, further holes 32 are worked into the ring 18 of the fixed component 2 at equal intervals around the circumference of the ring 18, and offset pistons 34 with an end piece are inserted into these holes 32. The other end pieces of the pistons 34 engage in holes 33 worked into the cover 12', with the effect that the ring 13 is connected to the cover 12' and therefore to the fixed component in a torsionally rigid arrangement by means of the pistons 34. Furthermore, the pistons 34 together with the cover 12' each form a control pressure chamber 35 into which a pressurised medium is supplied via ducts 36 provided in the ring 13 and ducts 37 worked into the piston 34, with the medium being supplied from an annular intermediate pressure chamber 31 which is worked into the end surface 16 of the ring 13 at a radial clearance from the annular groove 18. Since the control pressure chambers 35 are sealed by seals 38 inserted into the pistons 34 and the ring 13 is held on the insert 25 in an arrangement which, although torsionally rigid, does permit axial movement and the ring 13 is also supported on the ring 12 by means of a spherical outer jacket surface 30, a state of equilibrium results between the axially vectored force in the intermediate pressure chamber 31 and the axial forces created in the control pressure chambers 35.

When pressurised medium is supplied to the hollow clamping cylinder 4 via the device 1, the medium first flows via ducts 23, 26 and 27 into the annular groove 18 worked into the ring 13 and then—even if the component 3 is rotating—via the annular groove 19 and the duct 28 into the pressure space 7. The pressurised medium to be transported is also under pressure in the annular grooves 18 and 19 because the duct 18 acts as a throttle and, above all, due to the pressure which is built up in the pressure space 7, with the effect that an axial force is applied to the ring 13 by means of which it is moved slightly to the right and the radially aligned sealing gap 11 between it and the insert 15 is opened. This axial movement allows pressurised medium to flow out of the annular groove 18 inwards through sealing gap 11, however the principal flow is outwards into the intermediate pressure chamber 31 and, from there, via ducts 36 and 37 into the control pressure chambers 35. The pressure which builds up in the control pressure chambers causes the pistons 34, and with them the ring 13, to be pushed to the left against the forces present in the annular groove 18 and the intermediate pressure chamber 31, with the effect that the width of the radially aligned sealing gap 11 is reduced and the flow of pressurised medium into the control pressure chambers 35 is reduced. Since the pressure in the control pressure chambers 35 is reduced as a result of leakage or in a controlled fashion in the operational status of the ring 13 and the pistons 34, these movements repeat themselves constantly as soon as the state of equilibrium no longer exists; to a certain extent, the ring 13 fluctuates between two limit positions.

The forces acting on the pistons 34 not only counteract the axially vectored forces created in the annular groove 18 and the intermediate pressure chamber, but also the forces which arise as a result of the hydrodynamic friction of the pressurised medium flowing out in the radial sealing gap 11. Projections 39 are formed onto the side of the pistons 34 facing away from the cover 12' in order to restrict the width of the sealing gap 11 by forming stops 40 which act in conjunction with the cover 12'. The pressurised medium flowing out through the radially aligned sealing gap 11 is returned to the circuit via a connection 22 worked into the ring 12 which is mounted on the quill shaft 14 using anti-friction bearings 9.

In the embodiment shown in FIG. 3, the control pressure chambers 35' are provided within the ring 13. The pistons 34' are inserted into holes 32' worked into the ring 13 and into holes 33' worked into the cover 12', with the effect that the ring 13 is held in a torsionally rigid arrangement. As a result, the pressurised medium flows through ducts 36' out of the intermediate pressure chamber 31 and directly into the control pressure chamber 35' which is sealed by seals 38' inserted into the pistons 34'.

In order to control the build-up of pressure in the control pressure chambers 35', a duct 37' is worked into the centre of one of the pistons 34' and a throttle duct 46 is worked into the outer jacket surface in the area which engages in the hole 33'. The control chambers 35' are connected to one another via the intermediate pressure chamber 31 and the pressure in the control pressure chambers 35' is therefore limited by the pressurised medium flowing out via the throttle duct 46. FIG. 3 also shows that the fixed component 2 can be supported on a machine component by means of a holder 10 depicted with dotted/dashed lines, in which case it is not to be directly mounted on the rotating component 3.

FIG. 4 shows an equalisation chamber 41 allocated to the annular groove 18, with this equalisation chamber 41 being provided on the side of the ring 13' opposite to the annular groove 18. The cover 12' and the ring 13' are each provided with an axially projecting shoulder 42 or 43 in order to create the equalisation chamber 41, with the equalisation chamber 41 being enclosed by the shoulders 42 or 43. The equalisation chamber 41 is sealed using seals 44 and is connected to the duct 27 provided in the ring 13' by means of a duct 45.

An axial force opposed to the axial force created in the annual groove 18 builds up in the equalisation chamber 41. This results in these forces being cancelled out with the effect that the forces required for moving the ring 13' back can be kept at a low level.

FIG. 5 shows that an intermediate pressure chamber 51 connected to the control pressure chambers 35 can also be formed by means of an axially aligned gap 52 provided between the shaft 14 of the rotating component 3 and the ring 13". The radially aligned sealing gap 11', 11" is therefore divided into two sealing gaps which are offset to the side in relation to one another.

In the device 61 shown in FIG. 6 for transporting a pressurised medium from a fixed component 62 into a rotating, driven component 63 and a cylinder 74 connected to the aforementioned device 61, the fixed component 62 is composed of two rings 65 and 66 in which, although connected together in a torsionally rigid arrangement by means of a pin 67, it is possible for the ring 66 to be moved axially in relation to the ring 65. Furthermore, the radially aligned sealing gap 81, 81' is split into two partial areas between which is provided an axially aligned annular gap 83 which forms an intermediate pressure chamber 82. The intermediate pressure chamber 82 is connected to a circumferential control chamber 84 by means of a duct 85 worked into the ring 66.

Furthermore, an equalisation chamber 73 is provided in this embodiment and arranged in the same diameter range as an annular groove 70 by means of which the pressurised medium can be transported out of the ring 66 into an annular groove 71 worked into the rotating component 63, with the annular groove 71 being connected to the cylinder 64 by means a duct 72. The pressurised medium can be supplied from the connection line 74 to the annular groove 70.

The supply of pressurised medium to the cylinder 64 and the constant self-alignment of the ring 66 take place in the same way as in the device 1 shown in FIGS. 1 or 5. In this case, the pressurised medium flowing out of the sealing gap 81, 81' is also supplied back to the circuit via a return line 75 or a return duct 86 on the upstream side of the return line 75.

What is claimed:

1. A device (1; 61) for supplying a pressurised medium from a fixed component (2; 62) into a rotating, drivable component (3; 63), in particular for supplying a pressurised medium into a hollow clamping cylinder (4; 64) or the like, with a radially aligned sealing gap (11) being provided between the two components (2, 3), with annular grooves (12, 13; 70, 71) worked into the facing end surfaces (16, 17) of the components (2; 62; 3; 63) thereby enabling both components (2; 62; 3; 63) to communicate with one another and with the annular grooves (12, 13; 70, 71) being connected to a supply duct (23, 26, 27; 68, 69) for pressurised medium worked into the fixed component (2; 62) and to a duct (28; 72) for conveying the pressurised medium provided in the rotating component (3; 63), in which aforementioned device (1; 61) the fixed component (2; 62) consists of two rings (12, 13; 65, 66) connected together in a torsionally rigid fashion, with the ring (13; 66) which delimits the sealing gap (11; 81, 81') being held in an axially movable arrangement and at least one control pressure chamber (35; 84) being provided between the two rings (12, 13; 65, 66), characterised in that, the ring (13) of the fixed component (2) which is held in a movable arrangement has an intermediate pressure chamber (31) on its end surface (16) facing the sealing gap (11) and this intermediate pressure chamber (31) is arranged with a radial clearance from the annular groove (18) in the component (2), or that an intermediate pressure chamber (51; 82) is formed between the axially movable ring (13"; 66) of the fixed component (12; 62) and the rotating component (3; 63), with this intermediate pressure chamber (51; 82) comprising an annular gap (52; 83) preferably tilted in an axial direction and being enclosed by the components, and that the intermediate pressure chamber (31; 82) is permanently connected to the control pressure chamber (35; 84) by means of ducts (36, 37; 85) worked into the axially movable ring (13, 13"; 66).

2. The device in accordance with claim 1, characterised in that, the rotating component (3) comprises a shaft (14), preferably a quill shaft, inserted into the fixed component (2) with a shoulder (15) projecting radially from the shaft (14).

3. The device in accordance with claim 1, characterised in that, the movable ring (13) of the fixed component (2) is held on one or more inserts (25), each of which are arranged in an axially aligned hole (24), attached to a cover (12') of the fixed component (2) or, given a two-part embodiment of the fixed component (2), inserted into the fixed component (2).

4. The device in accordance with claim 3, characterised in that,
one of the inserts (25) is provided with a transfer duct (26) communicating with the supply ducts (23, 27) for pressurised medium which are worked into both rings (12, 13) of the fixed component (2).

5. The device in accordance with claim 1, characterised in that,
the fixed ring (12) accommodating the axially movable ring (13) supports the axially movable ring (13) in a self-aligning fashion by means of an outer jacket surface (30) with, for example, a spherical configuration.

6. The device in accordance with claim 1, characterised in that,
the control pressure chambers (35, 35') are formed by one or more pistons (34, 34') supported on the movable ring (13) or the fixed ring (12') with the pistons (34, 34') being inserted in holes (32, 33 or 32', 33') worked into both rings (12, 13).

7. The device in accordance with claim 6, characterised in that,
if the control pressure chambers (35) are arranged in the fixed ring (12'), the pistons (34) are provided with ducts (37) connecting the intermediate pressure chamber (31) with the control pressure chambers (35).

8. The device in accordance with claim 6, characterised in that,
if the control pressure chamber (35') is arranged in the axially movable ring (13), the control pressure chamber (35') is connected to the intermediate pressure chamber (31) by means of ducts (36') worked into the ring (13).

9. The device in accordance with claim 1, characterised in that,
the surfaces of the control pressure chambers (35, 35'; 84) upon which the pressurised medium acts are larger than the radial surfaces of the intermediate pressure chambers (31) and, if appropriate, the surfaces of the annular groove (18) worked into the axially movable ring (13) taken together.

10. The device in accordance with claim 1, characterised in that,
at least one of the control pressure chambers (35, 35') is provided with an outflow throttle (46).

11. The device in accordance with claim 10, characterised in that,
the outflow throttle (46) of the control pressure chambers (35') is configured in such a way that one of the pistons (34') is inserted into the hole (33') in the fixed ring (12') with radial play and, if the control pressure chambers (35') are arranged in the axially movable ring (13), each of the control pressure chambers (35') is provided with a connecting duct (37'), or that one of the pistons (34') has a throttle duct (46) connected to the control pressure chamber (35').

12. The device in accordance with claim 1, characterised in that,
in order to set the radial sealing gap (11) to the maximum size, the travel distance of the movable ring (13) is limited by one or more mechanical stops (40).

13. The device in accordance with claim 12, characterised in that,
the mechanical stops (40) are formed by the pistons (34) which are inserted in the axially movable ring (13) and act in conjunction with the fixed ring (12'), with the pistons (34) being provided with a projection (39) on their end surface facing the control pressure chamber (35).

14. The device in accordance with claim 1, characterised in that,
an equalisation chamber (41; 73) is assigned to the annular groove (18; 70) worked in the axially movable ring (13'; 66), with this equalisation chamber (41; 73) being enclosed by the two rings (12', 13'; 65, 66) on the side opposite the annular groove (18; 70) in the movable ring (41; 73) and connected to this annular groove (18; 70) or to the supply duct (68) for the pressurised medium and with the surface of the equalisation chamber (41; 73) which is pressed towards the annular groove (18; 70) being preferably about the same size as the radial annular surface of the annular groove (18; 70).

* * * * *